(12) United States Patent
Elliot et al.

(10) Patent No.: US 9,356,798 B2
(45) Date of Patent: *May 31, 2016

(54) ALARM SYSTEM IP NETWORK WITH PSTN OUTPUT

(71) Applicant: Numerex Corp., Atlanta, GA (US)

(72) Inventors: Harvey Alexander Elliot, Ojai, CA (US); Bryan Field Elliot, Ojai, CA (US); Daniel J. Elliot, Ojai, CA (US)

(73) Assignee: Numerex Corp., Atlanta, GA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/598,737

(22) Filed: Jan. 16, 2015

(65) Prior Publication Data

US 2015/0123783 A1  May 7, 2015

Related U.S. Application Data

(63) Continuation of application No. 13/194,912, filed on Jul. 30, 2011, now Pat. No. 9,054,893, which is a continuation of application No. 13/004,917, filed on Jan. 12, 2011, now Pat. No. 8,509,391, which is a continuation-in-part of application No. 12/504,709, filed on Jul. 17, 2009, now Pat. No. 9,131,040, which is a continuation-in-part of application No.

(Continued)

(51) Int. Cl.
*H04M 11/04* (2006.01)
*H04L 12/413* (2006.01)
*H04L 12/14* (2006.01)
*H04L 12/40* (2006.01)
*H04L 12/66* (2006.01)
*G08B 29/02* (2006.01)

(52) U.S. Cl.
CPC .............. *H04L 12/413* (2013.01); *G08B 29/02* (2013.01); *H04L 12/1471* (2013.01); *H04L 12/40013* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 4,465,904 A | 8/1984 | Gottsegen et al. |
| 4,692,742 A | 9/1987 | Raizen et al. |
| 4,918,717 A | 4/1990 | Bissonnette et al. |
| 5,134,644 A | 7/1992 | Garton et al. |
| 5,195,126 A | 3/1993 | Carrier et al. |
| 5,365,568 A | 11/1994 | Gilbert |
| 5,400,011 A | 3/1995 | Sutton |
| 5,463,595 A | 10/1995 | Rodhall |
| 5,568,475 A | 10/1996 | Doshi et al. |
| 5,736,927 A | 4/1998 | Stebbins et al. |
| 5,796,633 A | 8/1998 | Burgess et al. |

(Continued)

*Primary Examiner* — Maria El-Zoobi
(74) *Attorney, Agent, or Firm* — King & Spalding

(57) ABSTRACT

Alarm customers on VoIP may use an adapter for conversion to Internet Protocol (IP) signals or may have an alarm system that uses IP signals to transmit alarm signals over the Internet. IP signals from alarm customers may go to any monitoring center for alarm system monitoring. IP signals from alarm systems using IP conversion equipment can go only to monitoring centers with specialized receiving equipment specific to the type of transmitting equipment in use at the customer's premises. There is a pool of customers, whose dealers would convert to IP and stay with the current monitoring center if the center invested in receiving equipment. For the many small centers who will not or cannot invest in receiving equipment, the present invention will take IP signals from any or all brands of IP transmitting equipment, to a central server then retransmit to any center over POTS to the alarm monitoring center. Thus, an alarm monitoring center need not invest in a number of different IP monitoring systems in order to be IP monitoring compliant.

20 Claims, 2 Drawing Sheets

Related U.S. Application Data

12/018,724, filed on Jan. 23, 2008, now Pat. No. 8,369,487, which is a continuation-in-part of application No. 11/517,025, filed on Sep. 7, 2006, now Pat. No. 7,613,278, which is a continuation-in-part of application No. 11/348,291, filed on Feb. 6, 2006, now Pat. No. 7,734,020, which is a continuation-in-part of application No. 11/226,857, filed on Sep. 14, 2005, now Pat. No. 7,593,512, and a continuation-in-part of application No. 10/861,790, filed on Jun. 7, 2004, now Pat. No. 7,440,554, which is a continuation-in-part of application No. 10/840,280, filed on May 7, 2004, now abandoned, which is a continuation-in-part of application No. 10/462,708, filed on Jun. 17, 2003, now Pat. No. 7,245,703.

(60) Provisional application No. 60/651,662, filed on Feb. 11, 2005, provisional application No. 60/389,960, filed on Jun. 20, 2002.

(56) References Cited

U.S. PATENT DOCUMENTS

| | | |
|---|---|---|
| 5,808,547 A | 9/1998 | Carney |
| 5,838,223 A | 11/1998 | Gallant et al. |
| 5,877,684 A | 3/1999 | Lu |
| 5,923,731 A | 7/1999 | McClure |
| 5,940,474 A | 8/1999 | Ruus |
| 6,075,451 A | 6/2000 | Lebowitz et al. |
| 6,215,404 B1 | 4/2001 | Morales |
| 6,243,373 B1 | 6/2001 | Turock |
| 6,272,212 B1 | 8/2001 | Wulforst et al. |
| 6,288,642 B1 | 9/2001 | Dohrmann |
| 6,311,072 B1 | 10/2001 | Barclay et al. |
| 6,369,705 B1 | 4/2002 | Kennedy |
| 6,381,307 B1 | 4/2002 | Jeffers et al. |
| 6,400,265 B1 | 6/2002 | Saylor et al. |
| 6,438,124 B1 | 8/2002 | Wilkes et al. |
| 6,452,490 B1 | 9/2002 | Garland et al. |
| 6,493,435 B1 | 12/2002 | Petricoin |
| 6,553,100 B1 | 4/2003 | Chen et al. |
| 6,574,480 B1 | 6/2003 | Foladare et al. |
| 6,577,234 B1 | 6/2003 | Dohrmann |
| 6,603,845 B2 | 8/2003 | Jensen et al. |
| 6,661,340 B1 | 12/2003 | Saylor et al. |
| 6,683,526 B2 | 1/2004 | Bellin |
| 6,829,478 B1 | 12/2004 | Layton et al. |
| 6,831,557 B1 | 12/2004 | Hess |
| 6,870,906 B2 | 3/2005 | Dawson |
| 6,928,148 B2 | 8/2005 | Simon et al. |
| 6,965,313 B1 | 11/2005 | Saylor et al. |
| 6,973,165 B2 | 12/2005 | Giacopelli et al. |
| 7,002,462 B2 | 2/2006 | Welch |
| 7,009,519 B2 | 3/2006 | Leonard et al. |
| 7,103,152 B2 | 9/2006 | Naidoo et al. |
| 7,113,090 B1 | 9/2006 | Saylor et al. |
| 7,119,609 B2 | 10/2006 | Naidoo et al. |
| 7,245,703 B2 | 7/2007 | Elliot et al. |
| 7,262,690 B2 | 8/2007 | Heaton et al. |
| 7,406,710 B1 | 7/2008 | Zellner et al. |
| 7,429,921 B2 | 9/2008 | Seeley et al. |
| 7,440,554 B2 | 10/2008 | Elliot et al. |
| 7,542,721 B1 | 6/2009 | Bonner et al. |
| 7,558,379 B2 | 7/2009 | Winick |
| 7,593,512 B2 | 9/2009 | Elliot et al. |
| 7,593,513 B2 | 9/2009 | Muller |
| 7,613,278 B2 | 11/2009 | Elliot et al. |
| 7,619,512 B2 | 11/2009 | Trundle et al. |
| 7,633,385 B2 | 12/2009 | Cohn et al. |
| 7,653,186 B2 | 1/2010 | Hosain et al. |
| 7,734,020 B2 | 6/2010 | Elliot et al. |
| 7,751,540 B2 | 7/2010 | Whitfield et al. |
| 7,778,394 B2 | 8/2010 | Small et al. |
| 7,820,841 B2 | 10/2010 | Van Toor et al. |
| 7,848,505 B2 | 12/2010 | Martin et al. |
| 7,853,200 B2 | 12/2010 | Blum et al. |
| 7,855,635 B2 | 12/2010 | Cohn et al. |
| 7,911,341 B2 | 3/2011 | Raji et al. |
| 7,920,841 B2 | 4/2011 | Martin et al. |
| 7,920,842 B2 | 4/2011 | Martin et al. |
| 7,920,843 B2 | 4/2011 | Martin et al. |
| 7,961,088 B2 | 6/2011 | Watts et al. |
| 8,022,807 B2 | 9/2011 | Martin et al. |
| 8,073,931 B2 | 12/2011 | Dawes et al. |
| 8,116,724 B2 | 2/2012 | Peabody |
| 8,214,494 B1 | 7/2012 | Slavin |
| 8,335,842 B2 | 12/2012 | Raji et al. |
| 8,350,694 B1 | 1/2013 | Trundle et al. |
| 8,395,494 B2 | 3/2013 | Trundle et al. |
| 8,456,293 B1 | 6/2013 | Trundle et al. |
| 8,473,619 B2 | 6/2013 | Baum et al. |
| 8,478,844 B2 | 7/2013 | Baum et al. |
| 8,493,202 B1 | 7/2013 | Trundle et al. |
| 8,520,072 B1 | 8/2013 | Slavin et al. |
| 8,525,665 B1 | 9/2013 | Trundle et al. |
| 8,626,151 B2 | 1/2014 | Beppler et al. |
| 2002/0103898 A1 | 8/2002 | Moyer |
| 2002/0147982 A1 | 10/2002 | Naidoo et al. |
| 2002/0176581 A1 | 11/2002 | Bilgic |
| 2002/0177428 A1 | 11/2002 | Menard et al. |
| 2003/0027547 A1 | 2/2003 | Wade |
| 2003/0071724 A1 | 4/2003 | D'Amico |
| 2003/0128115 A1 | 7/2003 | Giascopelli et al. |
| 2004/0005044 A1 | 1/2004 | I-Hua-Yeh |
| 2004/0086088 A1 | 5/2004 | Naidoo |
| 2004/0086093 A1* | 5/2004 | Schranz ............ H04L 12/1895 379/37 |
| 2005/0099893 A1 | 5/2005 | Jyrinki |
| 2006/0023848 A1 | 2/2006 | Mohler et al. |
| 2006/0176167 A1 | 8/2006 | Dohrmann |
| 2006/0212793 A1* | 9/2006 | Marejka ............... G06F 9/546 715/205 |
| 2006/0239250 A1 | 10/2006 | Elliot et al. |
| 2007/0115930 A1 | 5/2007 | Reynolds et al. |
| 2007/0143838 A1 | 6/2007 | Milligan |
| 2007/0155412 A1 | 7/2007 | Kalsukis |
| 2008/0084291 A1 | 4/2008 | Campion, Jr. |
| 2008/0117029 A1 | 5/2008 | Dohrmann et al. |
| 2008/0191863 A1 | 8/2008 | Boling |
| 2009/0017757 A1 | 1/2009 | Koga |
| 2009/0077622 A1 | 3/2009 | Baum et al. |
| 2009/0213999 A1 | 8/2009 | Farrand |
| 2009/0248967 A1 | 10/2009 | Sharma et al. |
| 2009/0264155 A1 | 10/2009 | Nakayama et al. |
| 2009/0274104 A1 | 11/2009 | Addy |
| 2010/0007488 A1 | 1/2010 | Sharma et al. |
| 2010/0052890 A1 | 3/2010 | Trundle |
| 2010/0121948 A1 | 5/2010 | Procopio |
| 2010/0277271 A1 | 11/2010 | Elliot et al. |
| 2010/0289643 A1 | 11/2010 | Trundle |
| 2010/0289644 A1 | 11/2010 | Slavin |
| 2011/0065414 A1 | 3/2011 | Frenette |
| 2011/0169628 A1 | 7/2011 | Elliot |
| 2011/0319071 A1 | 12/2011 | Beppler et al. |
| 2012/0027010 A1 | 2/2012 | Elliot |
| 2012/0139718 A1 | 6/2012 | Foisy et al. |
| 2012/0250833 A1 | 10/2012 | Smith et al. |
| 2012/0250834 A1 | 10/2012 | Smith |
| 2012/0275588 A1 | 11/2012 | Gregory |
| 2013/0189946 A1 | 7/2013 | Swanson |
| 2013/0194091 A1 | 8/2013 | Trundle |
| 2013/0215266 A1 | 8/2013 | Trundle |
| 2013/0234840 A1 | 9/2013 | Trundle |

\* cited by examiner

ALARM SYSTEM IP NETWORK WITH PSTN OUTPUT

CROSS-REFERENCE TO RELATED APPLICATIONS

The present application is a Continuation application of U.S. patent application Ser. No. 13/194,912, filed on Jul. 30, 2011 and incorporated herein by reference; which in turn is a Continuation-In-Part application of U.S. patent application Ser. No. 13/004,917, filed on Jan. 12, 2011, (now U.S. Pat. No. 8,509,391) and incorporated herein by reference; which in turn is a Continuation-In-Part application of U.S. patent application Ser. No. 12/504,709, filed on Jul. 17, 2009, and incorporated herein by reference; which in turn is a Continuation-In-Part application of U.S. patent application Ser. No. 12/018,724, filed on Jan. 23, 2008, (now U.S. Pat. No. 8,369,487) and incorporated herein by reference; which in turn is a Continuation-In-Part of U.S. patent application Ser. No. 11/517,025, filed on Sep. 7, 2006, (now U.S. Pat. No. 7,613,278) and incorporated herein by reference; which in turn is a Continuation-In-Part of U.S. patent application Ser. No. 11/348,291, filed on Feb. 6, 2006, (now U.S. Pat. No. 7,734,020) and incorporated herein by reference; which in turn is a Continuation-In-Part of U.S. patent application Ser. No. 11/226,857, filed on Sep. 14, 2005, (now U.S. Pat. No. 7,593,512) and incorporated herein by reference; application Ser. No. 11/226,857 in turn claims priority from Provisional U.S. Patent Application Ser. No. 60/651,662, filed on Feb. 11, 2005 and incorporated herein by reference; application Ser. No. 11/226,857 is also a Continuation-In-Part (CIP) of application Ser. No. 10/861,790, filed on Jun. 7, 2004, (now U.S. Pat. No. 7,440,554) and incorporated herein by reference; which in turn is a Continuation-In-Part of U.S. patent application Ser. No. 10/840,280, filed on May 7, 2004, and incorporated herein by reference; which in turn is a Continuation-In-Part of U.S. patent application Ser. No. 10/462,708, filed on Jun. 17, 2003, (now U.S. Pat. No. 7,245,703) and incorporated herein by reference; which in turn claims priority from Provisional U.S. Patent Application Ser. No. 60/389,960, filed on Jun. 20, 2002, also incorporated herein by reference.

FIELD OF THE INVENTION

The present invention relates towards alarm and security system monitoring. In particular, the present invention is directed toward alarm system monitoring over the Internet, and more specifically with a technique for allowing alarm system monitoring companies that do not have Internet alarm monitoring capabilities to monitor alarm systems that communicate over the Internet, by providing a telephone output for conventional alarm monitoring equipment.

BACKGROUND OF THE INVENTION

In recent years, alarm systems are moving toward monitoring over the Internet, and the present inventors, as evidenced by the number of Patents previously incorporated by reference, have developed a number of techniques relating to Internet monitoring of alarm systems, including devices for converting conventional alarm systems to IP protocols, using VoIP and other techniques. Other alarm systems may be configured to interface directly with the Internet, through a wireless (WiFi) or network connection (e.g., plugging into a router, cable modem, DSL modem, or the like).

One problem with Internet monitoring of alarm systems is that there are a number of such IP alarm systems or converters (such as developed by the present inventors) on the market, and each may have its own particular format and central station monitoring hardware or software. If an alarm monitoring company wishes to monitor signals from a number of different brands or formats of equipment, it must invest in different hardware and software for each brand and type of equipment. Moreover, since such alarm monitoring systems may be "stand alone", the alarm monitoring company may have to maintain and monitor such separate systems, meaning that the monitoring personnel have to monitor and respond to multiple screens of data, each in a different format and using a different command and menu structure—and each requiring separate training.

Many smaller monitoring companies may not want to invest in new IP-based alarm equipment, but instead prefer to use their older POTS (Plain Old Telephone Service) or PSTN (Public Switched Telephone Network) interface. Such smaller alarm companies may find themselves unable to compete with larger companies, particularly as more and more customers switch to VoIP or IP based alarm protocols.

Thus, it remains a requirement in the art to provide a means for monitoring centers to be able to receive IP based alarm signals using existing equipment, and receive alarm signals on a single type of alarm monitoring equipment, without having to purchase and operate separate alarm monitoring systems for each equipment type and brand.

SUMMARY OF THE INVENTION

Alarm customers on VoIP may now use an adapter developed by the present inventors, for conversion to IP (Internet Protocol) as disclosed in Applicant's previous Patent Applications previously incorporated by reference. In the present invention, IP signals from customers can go to any monitoring center—those with corresponding servers on IP directly and those without corresponding servers, using the central server (middleware provider) of the present invention to dial on POTS (Plain Old Telephone Service) to the monitoring center or by communicating directly with the monitoring center over an IP link. IN this manner, the middleware server can take a number of alarm signals from disparate alarm system types, formats and paths (IP or POTS) and output them in a single format, which may be used by the alarm monitoring company. In one particular embodiment of the present invention, IP signals are translated back into POTS signals, such that an alarm monitoring company using POTS equipment can monitor IP alarm signals.

Traditionally, IP signals from alarm systems using IP conversion equipment (or IP based alarm systems) could only be sent to monitoring centers with specialized receiving equipment specific to the type of transmitting equipment in use at the customer's premise. There is a pool of customers, whose dealers would convert to IP and stay with the current monitoring center if the center invested in receiving equipment.

For the many small centers who will not or cannot invest in receiving equipment, the present invention takes IP signals from any or all brands of IP transmitting equipment, to a central server at a middleware provider which may then retransmit to any center over POTS or other format. The middleware server may also provide a suite of notification services also editable by the customer or dealer using a customer portal.

Thus, it is one objective of the present invention to convert non-standard and varied format IP signals to single standard signal, including a POTS signal, for delivery to a monitoring center, including a Prior Art POTS-type monitoring center.

Alarm system manufacturers are producing alarm equipment designed to transmit alarm data over the Internet. While there is a standard protocol available it is rarely used. Consequently there are several systems in use each requiring specialized server receiving equipment at the alarm monitoring center. Many smaller alarm monitoring centers will not purchase or cannot afford the servers for the different systems. The present invention allows IP transmissions from many different systems to be decoded at our server farm and the transmitted to alarm monitoring centers in one format, including via POTS.

This allows any alarm monitoring center to accept signals from all protocols that the server farm has available. The decoding servers essentially become a shared resource. The current VoIP Alarm platform which provides a user portal with SMS, IVR, email notifications and alarm history may also be provided to users.

DETAILED DESCRIPTION OF THE INVENTION

Figure 1:
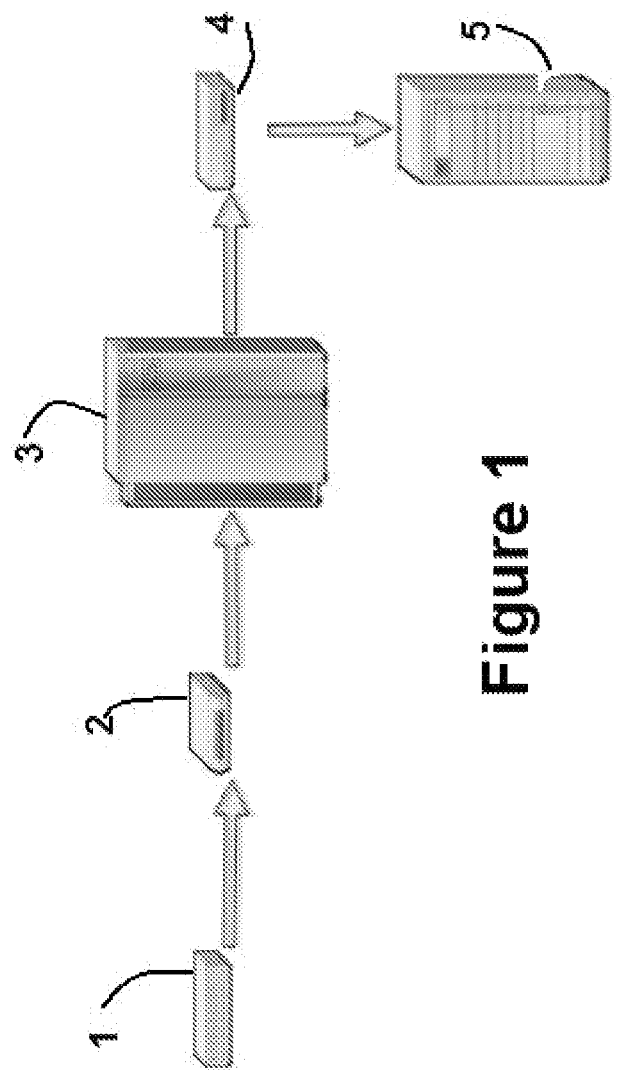
FIG. 1 is a block diagram of the IP to PSTN alarm translation system of the present invention.

The alarm translation system of the present invention is discussed below in connection with FIGS. 1 and 2.

One key to understanding the present invention is that in the alarm monitoring business, alarm monitoring companies and the company providing the alarm services may be two different entities. Thus, for example, if a customer contracts with ACME Alarm Systems Company for alarm services, ACME may in turn subcontract out the actual day-to-day monitoring of the customer's alarm system to a third party—perhaps even offshore—where operating costs are lower. The Alarm company may provide a branded identity (ACME) to the customer, as well as service (installation, repair) of the physical alarm system, billing services, and also middleware services, as described elsewhere in applicant's previous applications incorporated by reference.

However, Prior Art alarm systems use a number of formats to generate and transmit alarms, from early POTS (Plain Old Telephone Service) systems which would "dial out" on a PSTN (Public Switched Telephone Network) line, to newer systems, which may connect directly to the Internet or be configured to connect to the Internet as follows.

As previously noted, alarm systems may be modified or designed to send alarm signals over an IP link to an alarm monitoring center or to a middleware provider. FIG. 1 is a block diagram of the IP to PSTN alarm translation system of the present invention. Referring to FIG. 1, an IP-enabled alarm panel 1 may transmit an alarm signal over the Internet, via cable modem, DSL modem, router, or other Internet connection 2. Note that for purposes of this application, an IP-enabled alarm panel 1 may include an alarm panel designed to generate IP signals (e.g. though an Ethernet output) or a Prior Art alarm system converted to IP capability using the VoIP techniques or other techniques of the present inventors.

At a server 3, an IP to PSTN translator receives the IP protocol alarm signals from the internet connection 2 and looks up the correct monitoring company or station to call (based on a look-up table or database having alarm system identification information, to correlate alarm identification information with the correct monitoring station or company). The server then picks up a PSTN line and dials the receiver of a traditional central station and conveys the alarm signal using standard PSTN protocols. A receiver at the central station (monitoring company) receives the signals at a receiver 5 and decodes the PSTN alarm signal and conveys it to a dispatch system 5. Dispatch system 5 may comprise a Prior Art PSTN based alarm monitoring system which may be monitored by an individual. The individual may then see the alarm system codes and identification and take the normal steps in dispatching the alarm (calling the consumer to confirm false alarms, dispatching Police or Fire or Emergency personnel, and the like) as in the Prior Art.

In this manner, a Prior Art alarm monitoring company may receive alarm signals even from modern IP-based or converted alarm systems. The server 3 may be located at a middleware provider, who contracts with the consumer to provide alarm monitoring services, and in turn sub-contracts out the alarm monitoring services to the alarm monitoring company housing central station 5. Alternately, an Alarm monitoring company housing central station 5 may employ a middleware provider with server 3, in order to offer IP Alarm customers their monitoring services, without having to invest in new monitoring equipment.

In an alternative embodiment of the present invention, server 3 may receive IP signals from various alarm panels 1, which are in a number of different IP Alarm system formats and coding. Server 3 may then convert these codes into a standard format which in turn may be communicated to an alarm monitoring center 5 via PSTN connection 4, as illustrated in FIG. 1, or using an Internet connection. In this embodiment, numerous different Alarm IP formats may be converted by the middleware provider such than an alarm monitoring center need only have one type of central station monitoring equipment using one type of alarm coding protocols. In this manner, the middleware provider can act as an alarm system translator, taking a number of different alarm codes (both IP and POTS) and providing them to the monitoring station in a format desired by the monitoring station.

Figure 2:
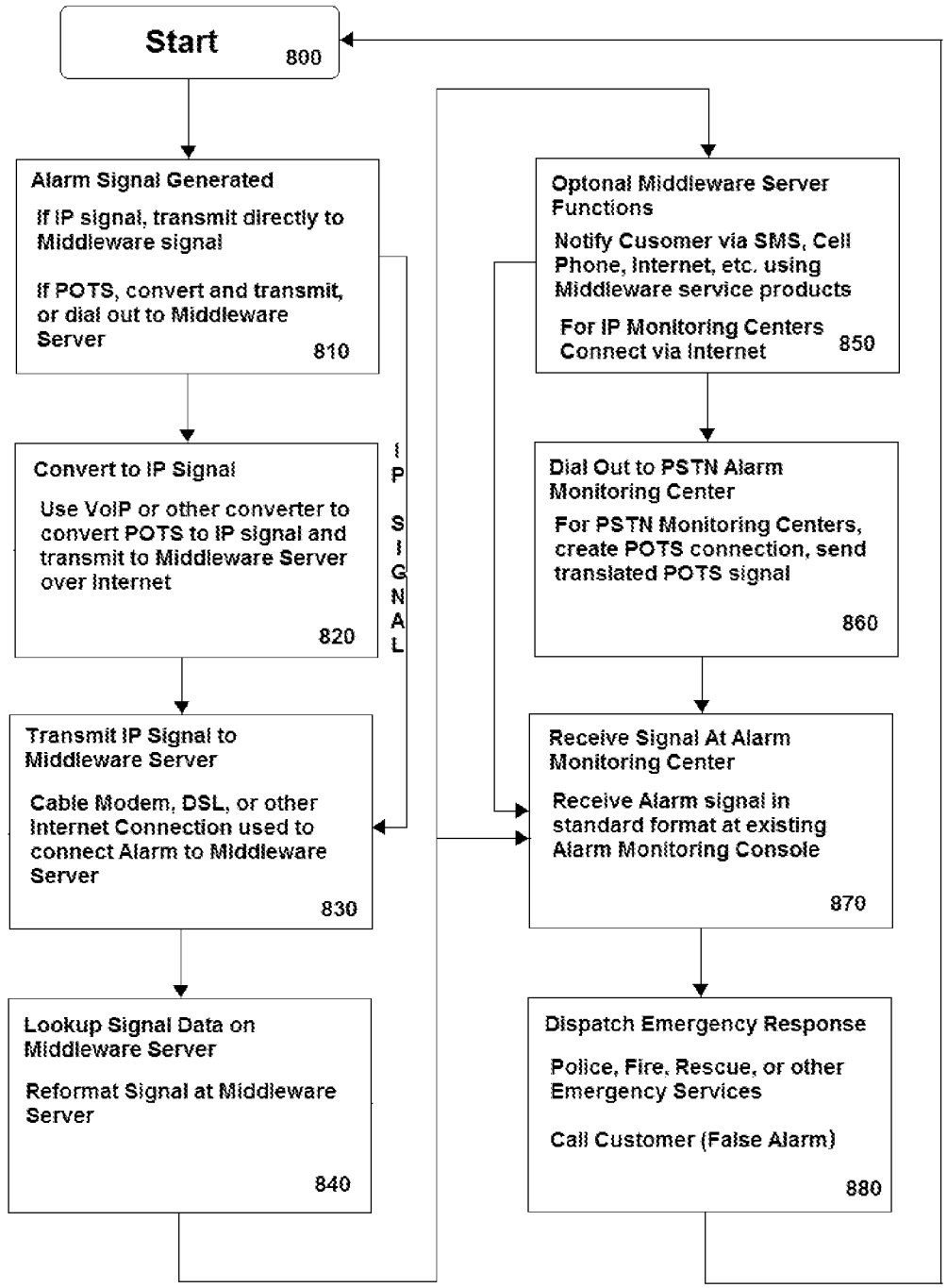
FIG. 2 is a flow chart illustrating the steps in the IP to PSTN alarm translation method of the present invention.

FIG. 2 is a flow chart illustrating the steps in the IP to PSTN alarm translation method of the present invention. Referring to FIG. 2, the process starts in step 800. In step 810, an alarm signal may be generated by an alarm panel, such as the IP-enabled alarm panel 1 of FIG. 1, or a conventional alarm panel (POTS output). Note than alarm signals may include actual alarm signals (break-in, fire, flood, smoke, glass breakage, door or window alarms, panic alarms, or the like) or may include other signals, such as maintenance and monitoring signals and periodic update signals.

In the preferred embodiment of the present invention, the alarm panel is an IP enabled alarm panel, meaning that it generates an IP signal directly to the middleware server, as illustrated by the connection to step 830. Alternately, the alarm panel may convert a POTS signal to an IP signal using a VoIP technique or other conversion technique 820 such as disclosed in the present application or applicant's previous applications incorporated by reference. This converted IP signal may then be sent to the middleware server in step 830. In addition, the middleware server may be configured to accept POTS signals directly through an input POTS line, although this is not the preferred embodiment of the present invention. However, the overall idea behind the present invention, as illustrated in FIG. 2, is to accept alarm signals from a number of different types and models of alarm systems, using different formats and signal paths, and then output these signals in a single, common format over a single signal path, as will be discussed below in more detail.

In step 840, the alarm signals, having been received in different formats, are reformatted at the middleware server. Applicant's middleware server and processes have been described in more detail in the applications incorporated by reference and the details are not described here for the purposes of brevity and clarity. Data from incoming signals (e.g., alarm panel serial number, incoming phone number, IP address or other indicia) are used to identify the customer and the alarm system type. From this data, the alarm signal may be reformatted into a common, single format. Thus, for example, IP signals from a number of different manufacturers may be reformatted to an industry standard alarm signal format or a single proprietary format. The desired output format may be determined by the format desired by the monitoring company, which may possess equipment accepting one or more particular formats.

This forma may include a legacy POTS format favored by older alarm companies and monitoring companies. If an IP format is selected, this signal may be sent via Internet directly the monitoring company in step 870. In step 850, middleware functions may be performed. Again, these functions have been described in applicant's previous applications incorporated by reference. These functions include, but are not limited to, notifying a customer directly via cell phone, SMS, Internet, or other means, and allowing the customer to cancel the alarm at the middleware stager, or otherwise interface and interact with the alarm system. These middleware functions may be optional, depending on the nature of the alarm company and also whether the customer paid for such services, which may be offered a la carte or as part of an alarm monitoring package.

If the alarm monitoring center accepts IP signals, these signals may be sent directly to the center via internet as illustrated by the connection between step 850 and 870. In step 860, if the alarm signals are to be sent in POTS format over a PSTN, the middleware server may dial out to the alarm center and transmit the alarm signals in POTS format using one of the known POTS alarm formats known in the art, or a format accepted by the monitoring center.

In step 870, the alarm signals are received by the monitoring center in a format acceptable to the monitoring center's existing equipment. Regardless of whether the monitoring centers uses antiquated POTS equipment, or modern IP-based equipment, the present invention is capable of interfacing with both types (and the several varieties of each). In this manner, a middleware provider can offer alarm monitoring services and then contract out the actual alarm monitoring to the alarm monitoring service that is most cost-effective, without having to force the alarm monitoring center to upgrade its equipment or change formats. For the middleware provider, changing alarm monitoring centers is simply a matter of reprogramming the output to the desired input format of the monitoring center. In this manner, the middleware provider can offer a central, branded, alarm service, and change monitoring centers in a seamless manner that is transparent to the end user.

In step 880, the alarm monitoring center receives the alarm messages in the usual manner. To the alarm monitoring center technicians and monitoring staff, the entire process is transparent—the incoming signals appear to be in the same format as all other incoming alarm signals, and the brand and type of alarm system used by the customer is irrelevant—as is the mode of communication of alarm signals—IP or POTS.

The alarm monitoring center may then perform its usual functions—calling fire, police, or other emergency services, or calling the customer to confirm whether a false alarm has been triggered. From both the customer and alarm center monitoring point of view, the entire transaction is transparent and works as if the customer's alarm was tailored to the alarm monitoring center's equipment. However, since the present invention provides middleware translation, neither the customer nor the alarm monitoring center need purchase new equipment, unless desired.

Thus, the present invention allows an alarm service provider (middleware provider) to achieve greater customer penetration and more conquest sales, as they can now offer to monitor a customer's alarm system with little or no alteration in the hardware used by the customer. And the alarm service provider can provide superior service and lower prices by being able to choose among a variety of alarm monitoring companies to do the actual alarm monitoring—and be able to switch from one to another at will (or use multiple companies) without having to swap out hardware at either end. In this manner, the middleware provider is not married to one company and thus cannot subject to arbitrary price hikes or the like by the monitoring company. In addition, the middleware provider can change alarm monitoring companies if the service from the alarm monitoring company is less expected.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method comprising the steps of:
   receiving, at a middleware server, a first customer alarm signal having a POTS (Plain Old Telephone Service) format from a first alarm panel associated with a first alarm system at a first premises,
   receiving, at the middleware server, a second customer alarm signal having a second format from a second alarm panel associated with a second alarm system at a second premises,
   converting, at the middleware server, the first and second customer alarm signals into monitoring center alarm signals having a common format, wherein the first alarm signal is converted from the POTS format to an IP format using a VoIP (Voice over Internet Protocol) converter, and
   transmitting from the middleware server to an alarm monitoring center the monitoring center alarm signals having the common format.

2. The method of claim 1, wherein the monitoring center alarm signals comprise Public Switched Telephone Network (PSTN) alarm signals.

3. The method of claim 1, wherein the monitoring center alarm signals are Public Switched Telephone Network (PSTN) alarm signals.

4. The method of claim 1, wherein the second format of the second customer alarm signal comprises an IP format.

5. The method of claim 1, wherein the converting step further comprises:
   looking up a customer number derived from the second customer alarm signal, in a database,
   determining customer alarm system type and an associated alarm monitoring center for the looked up customer number, and
   converting the second customer alarm signal to one of the monitoring center alarm signals having the common format, based on the determined alarm system type and the determined associated alarm monitoring center.

6. The method of claim 1, further comprising the steps of:
at the middleware server, looking up a customer number derived from the first customer alarm signal in a database,
at the middleware server, determining whether a customer associated with the customer number is to be directly notified of alarm events, and
responsive to the determination, transmitting, from the middleware server to the customer, a signal indicating that the first customer alarm signal has been generated.

7. The method of claim 1, wherein the middleware server comprises a server farm.

8. The method of claim 1, wherein the VOIP converter is operative to convert signals having IP, POTS, and PSTN formats into the monitoring center alarm signals having the common format.

9. The method of claim 1, wherein the first premises is associated with a first customer and the second premises is associated with a second customer.

10. A middleware server comprising:
a first communication interface configured to receive a plurality of customer alarm signals transmitted from a plurality of customer alarm systems, wherein the plurality of customer alarm signals comprises at least one customer alarm signal having a POTS (Plain Old Telephone Service) format;
a converter that is operative to convert the received customer alarm signals to monitoring center alarm signals having a common format;
a VoIP (Voice over Internet Protocol) converter, operative to convert the POTS format of the at least one customer alarm signal to an IP (Internet Protocol) format; and
a second communication interface configured to transmit the monitoring center alarm signals to an alarm monitoring center.

11. The middleware server of claim 10, wherein one of the plurality of customer alarm systems comprises an IP signal generating alarm panel operative to generate one of the customer alarm signals in an IP signal format.

12. The middleware server of claim 10, wherein the received plurality of customer alarm signals comprises at least one other customer alarm signal having an IP format.

13. The middleware server of claim 10, further comprising:
a database operative to look up customer numbers derived from the plurality of customer alarm signals, and
a processor programmed to determine customer alarm system type and monitoring center for each looked up customer number, and to implement protocol conversions based on the determined customer alarm system types.

14. The middleware server of claim 10, wherein the converter is operative to convert between IP and Public Switched Telephone Network (PSTN) formats.

15. The middleware server of claim 10, further comprising:
a database for looking up customer numbers derived from respective customer alarm signals, and
a processor configured to determine whether customers have elected to be directly notified of customer alarm signal events and to transmit alarm notifications for customer receipt.

16. A middleware server comprising:
a first communication interface configured for receiving a plurality of customer alarm signals having different formats, each of the customer alarms signals received from a different alarm panel associated with a different alarm system at a different premises;
a processor configured to convert the plurality of customer alarm signals into monitoring center alarm signals having a common format; and
a second communication interface operable to transmit the monitoring center alarm signals having the common format to an alarm monitoring center,
wherein the plurality of customer alarm signals having different formats comprise a customer alarm signal in a POTS (Plain Old Telephone Service) format, and
wherein the processor is further configured to convert the customer alarm signal in the POTS format into an IP signal.

17. The middleware server of claim 16, wherein the customer alarm signals having different formats comprise an IP-formatted customer alarm signal.

18. The middleware server of claim 16, wherein the processor is further configured to:
look up a customer number derived from one of the customer alarm signals in a database;
determine customer alarm system type and an associated alarm monitoring center for the looked up customer number; and
convert the one customer alarm signal to one of the monitoring center signals having the common format, based on the determined alarm system type.

19. The middleware server of claim 16, wherein one of the customer alarm signals comprises an Internet Protocol (IP) alarm signal, and the monitoring center alarm signals comprise Public Switched Telephone Network (PSTN) alarm signals.

20. The middleware server of claim 16, wherein the different formats comprise different IP formats.

* * * * *